(12) United States Patent
Bruneau et al.

(10) Patent No.: US 9,266,399 B2
(45) Date of Patent: Feb. 23, 2016

(54) TIRE WITH IMPROVED BEADS

(75) Inventors: François-Xavier Bruneau, Clermont-Ferrand (FR); Frédéric Bourgeois, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 428 days.

(21) Appl. No.: 13/994,421

(22) PCT Filed: Dec. 9, 2011

(86) PCT No.: PCT/EP2011/072326
§ 371 (c)(1),
(2), (4) Date: Sep. 20, 2013

(87) PCT Pub. No.: WO2012/080121
PCT Pub. Date: Jun. 21, 2012

(65) Prior Publication Data
US 2014/0000780 A1 Jan. 2, 2014

Related U.S. Application Data

(60) Provisional application No. 61/453,476, filed on Mar. 16, 2011.

(30) Foreign Application Priority Data

Dec. 14, 2010 (FR) .................................... 10/60494

(51) Int. Cl.
*B60C 15/00* (2006.01)
*B60C 15/06* (2006.01)

(52) U.S. Cl.
CPC ....... *B60C 15/0603* (2013.04); *B60C 2001/005* (2013.04); *B60C 2001/0058* (2013.04); *B60C 2015/009* (2013.04); *B60C 2015/061* (2013.04); *B60C 2015/0621* (2013.04)

(58) Field of Classification Search
CPC B60C 15/00; B60C 15/0009; B60C 15/0027; B60C 15/06
See application file for complete search history.

(56) References Cited

FOREIGN PATENT DOCUMENTS

| EP | 1559535 | * | 8/2005 |
| JP | 52131305 | * | 11/1977 |

(Continued)

*Primary Examiner* — Justin Fischer
(74) *Attorney, Agent, or Firm* — Cozen O'Connor

(57) ABSTRACT

Tire comprising two beads comprising an annular reinforcing structure and a carcass reinforcement which is anchored in the two beads by being wrapped around the annular reinforcing structure so as to form, in each bead, a main portion and a wrapped-around portion, in which each bead comprises a bead filler situated between the main portion and the wrapped-around portion of the carcass reinforcement, and an outer strip positioned axially on the outside of the carcass reinforcement and of the bead filler in which the entity formed by the bead filler and the outer strip has a thickness E(r), the thickness E(r) changes as a function of the distance r such that, in the range of distances r comprised between 25 and 45% of the height H of the tire, the variation in thickness $$\frac{\partial E(r)}{\partial r}$$

Is less than or equal to −0.25 mm/mm over at least 4% of the height H of the tire, and in which the annular reinforcing structure has a maximum axial width DE such that the ratio $$\frac{E(r)_{max} - DE}{E(r)_{max}},$$

where $E(r)_{max}$ is the maximum value of the thickness E(r), is less than or equal to 10%.

6 Claims, 5 Drawing Sheets

(56) References Cited

FOREIGN PATENT DOCUMENTS

| | | | |
|---|---|---|---|
| JP | 55-132312 | * | 10/1980 |
| JP | 58004611 | * | 1/1983 |
| JP | 59089206 | * | 5/1984 |
| JP | 62004614 | * | 1/1987 |
| JP | 2002-200905 | * | 7/2002 |
| JP | 2003-154818 | * | 5/2003 |
| JP | 2005-67471 | * | 3/2005 |
| WO | WO 2004/033789 | * | 4/2004 |
| WO | WO 2007/003246 | * | 1/2007 |
| WO | WO 2007/042119 | * | 4/2007 |
| WO | WO 2010/072736 | | 7/2010 |

* cited by examiner

TIRE WITH IMPROVED BEADS

RELATED APPLICATIONS

This is a U.S. National Stage of Application No. PCT/EP2011/072326, filed on Dec. 9, 2011.

This application claims the priority of French application Ser. No. 10/60494 filed on Dec. 14, 2010 and U.S. Provisional Application No. 61/453,476 filed on Mar. 16, 2011, the content of both of which are hereby incorporated by reference.

FIELD OF THE INVENTION

The present invention relates to passenger vehicle tires with a load index above 100, like most tires designed to be fitted to vehicles of the "4×4" type.

BACKGROUND

The load index of a tire is a parameter well known to those skilled in the art. It quantifies the maximum load that a tire is able to bear when mounted on a mounting rim and inflated to service pressure. A load index of 100 corresponds to a maximum load of 800 kg.

Most passenger vehicle tires comprise:
two beads designed to come into contact with a mounting rim, each bead comprising at least one annular reinforcing structure;
two sidewalls extending the beads radially outwards, the two sidewalls meeting in a crown comprising a crown reinforcement surmounted by a tread;
at least one carcass reinforcement extending from the beads through the sidewalls as far as the crown, the carcass reinforcement comprising a plurality of carcass reinforcing elements and being anchored in the two beads by being wrapped around the annular reinforcing structure so as to form, within each bead, a main portion and a wrapped-around portion;
a bead filler situated radially on the outside of the annular reinforcing structure and at least partially between the main portion and the wrapped-around portion of the carcass reinforcement, and
an outer strip positioned axially on the outside of the carcass reinforcement and of the bead filler.

Recently, there have been proposals to improve the rolling resistance of passenger vehicle tires by optimizing the beads thereof. Document WO 2010/072736 notably teaches the use of special rubber compounds. The outer strip and possibly the bead filler are made using rubber compounds that have an elastic modulus G' less than or equal to 15 MPa and a viscous modulus G" such that:

$$G''[\text{MPa}] \leq 0.2 \cdot G'[\text{MPa}] - 0.2 \text{ MPa},$$

the elastic and viscous moduli being measured at 23° C.

That document also recommends further reducing the rolling resistance by optimizing the geometry of that or those portions of the tire that have these moduli. In particular, the portion of rubber compound having an elastic modulus G' less than or equal to 15 MPa and a viscous modulus G" such that:

$$G''[\text{MPa}] 0.2 - G'[\text{MPa}] - 0.2 \text{ MPa},$$

has, in any radial cross section, a thickness E(r), this thickness corresponding to the length of the intersection of the direction perpendicular to the main portion of the carcass reinforcement with the portion of rubber composition, r denoting the distance separating the intersection of the direction perpendicular to the main portion of the carcass reinforcement from the radially innermost point of the annular reinforcing structure. The thickness E(r) changes as a function of the distance r such that, in the range of distances r comprised between 20 and 50 mm, the variation in thickness $$\frac{\partial E(r)}{\partial r}$$

is less than or equal to −0.25 mm/mm (and preferably less than or equal to −0.3 mm/mm) over at least 5 mm. In other words, it is advantageous to ensure that the entity formed by the bead filler and the outer strip is "squat", that is to say shorter and wider than in conventional tires.

When implementing this teaching in tires designed to be fitted to vehicles of the "4×4" type that have a load index above 100, i.e. tires which traditionally have had very stiff (above of 50 MPa) bead fillers, it has been found that the incorporation of thick outer strips presents a problem of industrial robustness. Because the quantities of rubber compound involved are fairly great, it is difficult to prevent rubber from moving while the tires are being cured. As a result, the proportion of tires that fail to meet the specifications increases significantly.

SUMMARY OF THE INVENTION

One of the objects of the present invention is to provide a tire with a high load index that has low rolling resistance and high cornering stiffness without, as a result, impairing industrial robustness.

This object is achieved by use of a wide annular reinforcing structure.

More specifically this object is achieved by a tire comprising:
two beads designed to come into contact with a mounting rim, each bead comprising at least one annular reinforcing structure;
two sidewalls extending the beads radially outwards, the two sidewalls meeting in a crown comprising a crown reinforcement surmounted by a tread; and
at least one carcass reinforcement extending from the beads through the sidewalls as far as the crown, the carcass reinforcement comprising a plurality of carcass reinforcing elements and being anchored in the two beads by being wrapped around the annular reinforcing structure so as to form, within each bead, a main portion and a wrapped-around portion, each wrapped-around portion extending radially outwards as far as an end situated a radial distance DRR from the innermost point of the annular reinforcing structure of the bead, the radial distance DRR being greater than or equal to 7%, and less than or equal to 85% (and preferably greater than or equal to 10% and less than or equal to 20%), of the radial height H of the tire, Each bead comprises a bead filler, the bead filler being situated radially on the outside of the annular reinforcing structure and at least partially between the main portion and the wrapped-around portion of the carcass reinforcement, the bead filler extending radially outwards from the radially innermost point of the annular reinforcing structure of the bead as far as radial distance DRB from the innermost point, the radial distance DRB being less than or equal to 20% of the radial height H of the tire. As is well known to those skilled in the art, it is appropriate to maintain a certain difference (typically 5 mm) between DRR and DRB in order to avoid a negative impact on the endurance of the tire.

Each bead further comprises an outer strip positioned axially on the outside of the carcass reinforcement and of the bead filler, each outer strip extending between a radially inner end of the outer strip and a radially outer end of the outer strip, the radially inner end of the outer strip being situated at a distance DRI from the radially innermost point of the annular reinforcing structure of the bead, the radial distance DRI being less than or equal to 20% of the radial height H of the tire, the radially outer end of the outer strip being situated at a distance DRL from the radially innermost point of the annular reinforcing structure of the bead, the radial distance DRL being greater than or equal to 25% (and preferably greater than or equal to 40%) and less than or equal to 50% (and preferably less than or equal to 45%) of the radial height H of the tire.

The bead filler and the outer strip are made of a rubber compound that has an elastic modulus G' less than or equal to 15 MPa and a viscous modulus G" such that:

$$G''[MPa] \le 0.2 \cdot G'[MPa] - 0.2 \text{ MPa},$$

the elastic and viscous moduli being measured at 23° C.

The entity formed by the bead filler and the outer strip has a thickness E(r), this thickness corresponding to the length of the intersection of the direction perpendicular to the main portion of the carcass reinforcement with the entity, r denoting the distance separating the intersection of the direction perpendicular to the main portion of the carcass reinforcement from the radially innermost point of the annular reinforcing structure, the thickness E(r) changes as a function of the distance r such that, in the range of distances r comprised between 25 and 45% of the radial height H of the tire, the variation in thickness $$\frac{\partial E(r)}{\partial r}$$

is less than or equal to −0.25 mm/mm (and preferably less than or equal to −0.3 mm/mm) over at least 4% of the height H of the tire.

In one embodiment of the invention, the at least one annular reinforcing structure has a maximum axial width DE such that the ratio $$\frac{E(r)_{max} - DE}{E(r)_{max}},$$

in which $E(r)_{max}$ is the maximum value of the thickness E(r), is less than or equal to 10% (and preferably less than or equal to 7%). Of course, when the at least one annular reinforcing structure is formed of a set of threads, it is the maximum axial width DE of the set that is considered.

DETAILED DESCRIPTION OF THE DRAWINGS

In the use of the term "radial" it is appropriate to make a distinction between several different uses that the person skilled in the art makes for this word. Firstly the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress is said to be made "radially inwards (or outwards)" when progressing towards smaller (or larger) radii. Where radial distances are involved, it is this sense of the term that applies also.

By contrast, a thread or reinforcement is said to be "radial" when the thread or the reinforcing elements of the reinforcement make an angle greater than or equal to 80° and less than or equal to 90° with the circumferential direction. Let us specify that in this document, the term "thread" is to be understood in an entirely general sense and encompasses threads in the form of monofilaments, multifilaments, cords, folded yarns or equivalent assemblies, that being the case irrespective of the material of which the thread is made or the surface treatment it may have received to encourage it to bond to the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further away from the median plane of the tire than is the point P8. The "median plane" of the tire is the plane perpendicular to the axis of rotation of the tire and which lies equidistant between the annular reinforcing structures of each bead.

A "circumferential" direction is a direction perpendicular both to a radius of the tire and to the axial direction.

Within the context of this document, the expression "rubber compound" denotes a rubber compound containing at least an elastomer and a filler.

Figure 1:
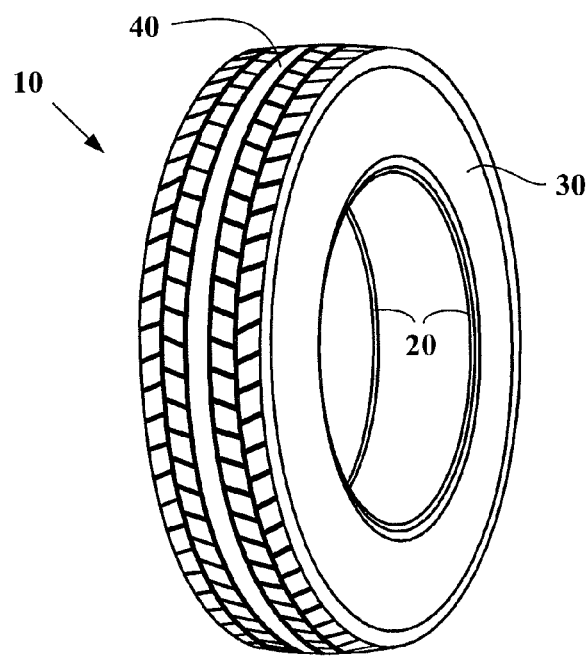
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inwards, and two beads 20 radially on the inside of the sidewalls 30.

Figure 2:
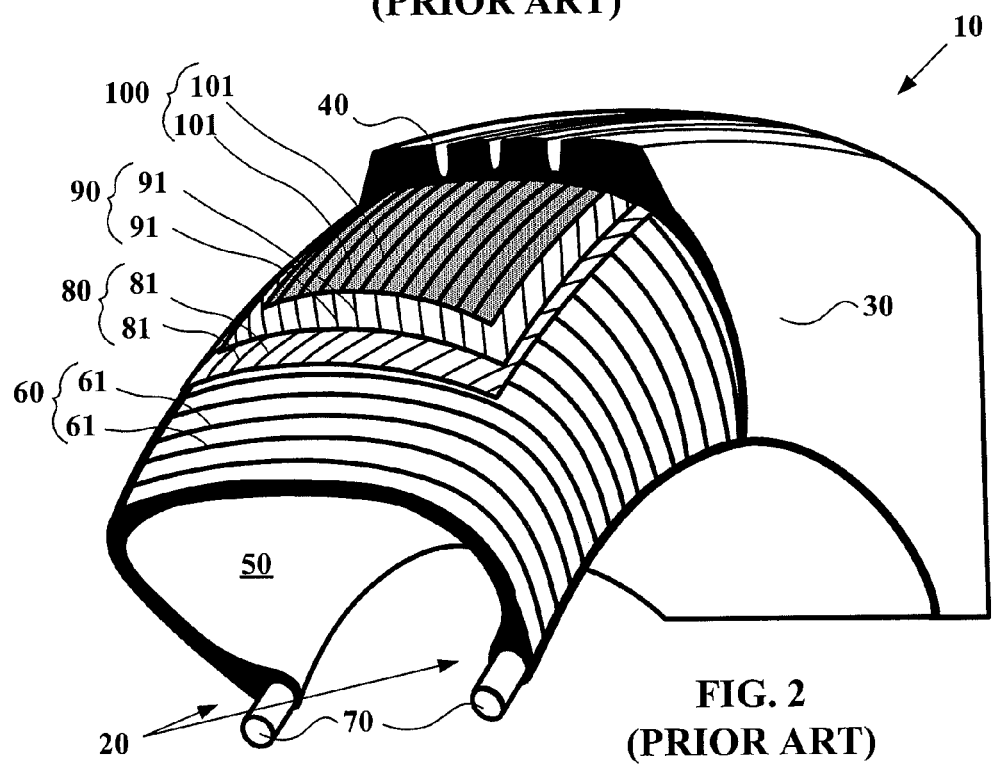
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 consisting of threads 61 coated with rubber compound, and two beads 20 each comprising annular reinforcing structures 70 which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced by thread-like reinforcing elements 81 and 91 which are parallel within each layer and crossed from one layer to the other, making angles comprised between 10° and 70° with the circumferential direction. The tire also comprises a hooping reinforcement 100, positioned radially on the outside of the crown reinforcement, this hooping reinforcement 100 being formed of reinforcing elements 101 directed circumferentially and wound in a spiral. A tread 40 is laid on the hooping reinforcement 100; it is this tread 40 which provides contact between the tire 10 and the road. The tire 10 depicted is a "tubeless" tire: it comprises an "inner liner" 50 made of a rubber compound impervious to the inflating gas, covering the interior surface of the tire.

Figure 3:
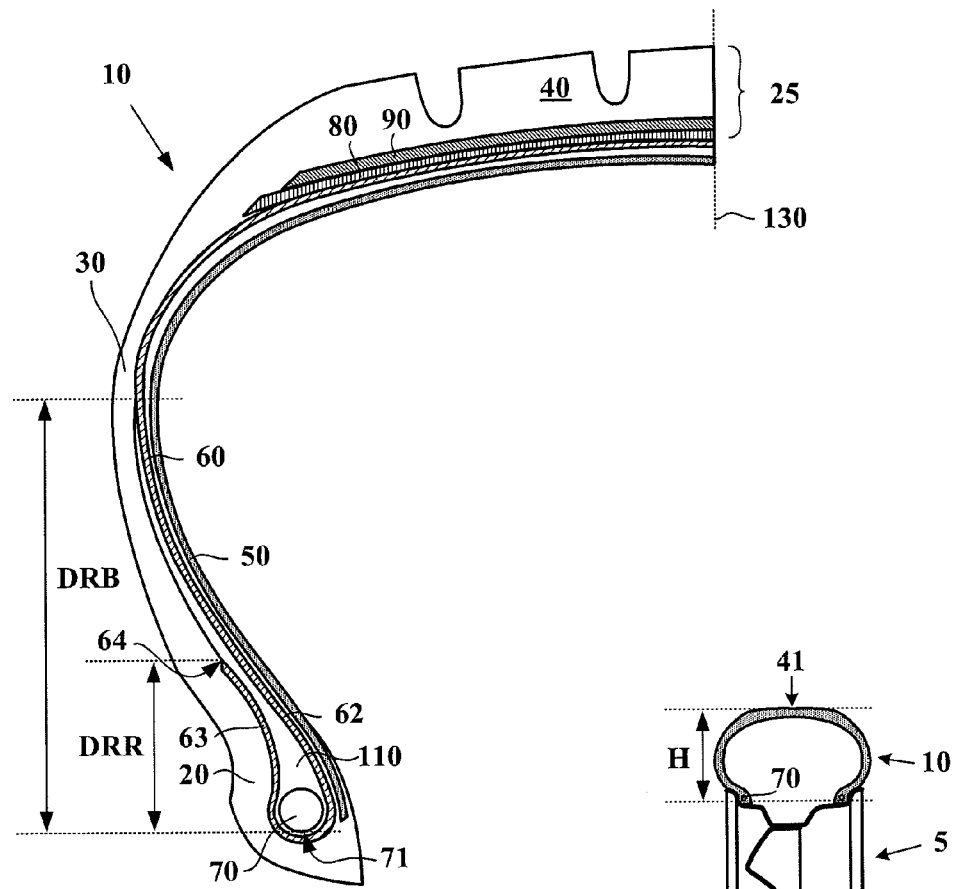
FIG. 3 depicts, in radial section, one quarter of a tire according to the prior art.

FIG. 3 schematically depicts, in radial section, one quarter of a tire 10 according to the prior art. The tire 10 comprises two beads 20 designed to come into contact with a mounting rim (not depicted), each bead 20 comprising an annular reinforcing structure, in this instance a bead wire 70. Two sidewalls 30 extend the beads 20 radially outwards and meet in a crown 25 comprising a crown reinforcement formed of a first layer of reinforcements 80 and of a second layer of reinforcements 90 and surmounted radially by tread 40. Each layer of reinforcements comprises thread-like reinforcements coated in a matrix formed of rubber compound. The reinforcements in each layer of reinforcements are substantially mutually parallel; reinforcements in the two layers are crossed from one layer to the other at an angle of about 20°, as is well known to those skilled in the art for radial tires.

The tire 10 further comprises a carcass reinforcement 60 which extends from the beads 20 through the sidewalls 30 as far as the crown 25. This carcass reinforcement 60 here comprises thread-like reinforcements directed substantially radially, that is to say making an angle greater than or equal to 65° and less than or equal to 90° with the circumferential direction.

The carcass reinforcement 60 comprises a plurality of carcass reinforcing elements and is anchored in the two beads 20 by being wrapped around the bead wire 70, so as to form, in each bead, a main portion 62 and a wrapped-around portion 63. The wrapped-around portion extends radially outwards as far as an end 64 situated a radial distance DRR from the radially innermost point 71 of the annular reinforcing structure of the bead, the radial distance DRR here being equal to 22% of the radial height H of the tire.

Figure 4:
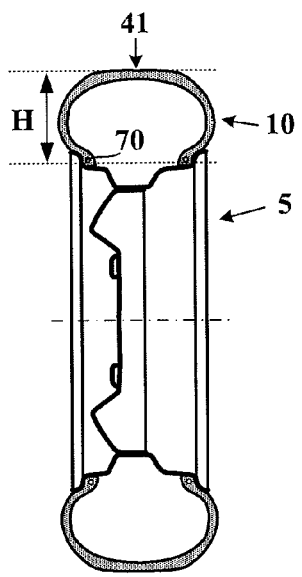
FIG. 4 illustrates how the height H of the tire is determined.

The "radial height" H of a tire is defined as being the radial distance between the radially innermost point 71 of the annular reinforcing structure 70 of the bead 20 and the radially outermost point 41 (FIG. 4) of the tread 40 when the tire 10 is mounted on a mounting rim 5 (as has been depicted in FIG. 4) and inflated to its service pressure.

Each bead comprises a bead filler 110, the bead filler being situated radially on the outside of the bead wire 70 and, at least partially, between the main portion 62 and the wrapped-around portion 63 of the carcass reinforcement 60.

The bead filler 110 extends radially outwards from the radially innermost point 71 of the annular reinforcement structure of the bead as far as a radial distance DRB from said point, the radial distance DRB being greater than or equal to 20% of the radial height H of the tire. In this particular instance, the bead filler 110 extends as far as the equator of the tire. What is meant, in the context of the present document, by the "equator" of the tire is the radial height of the point of greatest axial extension of the carcass reinforcement. In a radial section through the tire, the equator appears as the axial straight line passing through the points at which the carcass reinforcement has its greatest axial width when the tire is mounted on the rim and inflated. When the carcass reinforcement reaches this greatest axial width at a number of points, it is the radial height of the point closest to the mid-height H/2 of the tire that is considered to define the equator of the tire. The equator thus defined should not be confused with the median plane 130 of the tire which is also sometimes known as the "equator" in documents of the prior art.

The interior surface of the tire 10 is covered with an inner liner 50.

Figure 5:
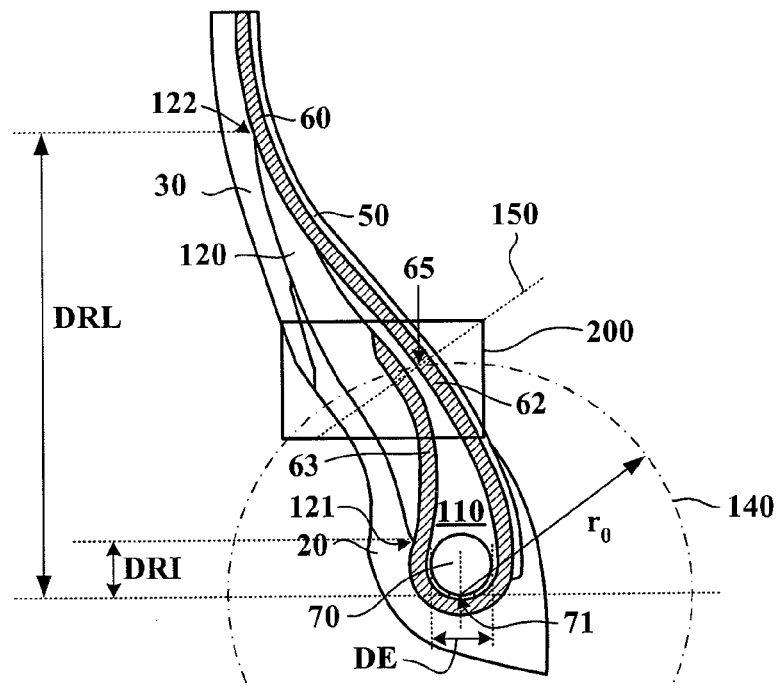
FIGS. 5 and 6 illustrate how the thickness of the entity formed by the bead filler and the outer strip is determined.

It is also known practice to provide an outer strip 120 placed axially on the outside of the carcass reinforcement and of the bead filler, as in the tire depicted in FIG. 5. Each outer strip 120 extends radially between a radially inner end 121 of the outer strip 120 and a radially outer end 122 of the outer strip 120. The radially inner end 121 of the outer strip 120 is situated a radial distance DRI from the radially innermost point 71 of the annular reinforcing structure 70 of the bead, DRI being less than or equal to 20% of the radial height H of the tire. The radially outer end 122 of the outer strip 120 is situated a radial distance DRL from the radially innermost point 71 of the annular reinforcing structure 70 of the bead, the radial distance DRL being greater than or equal to 25% (and preferably greater than or equal to 40%) and less than or equal to 50% (and preferably less than or equal to 45%) of the radial height H of the tire.

Traditionally, in order to form the bead filler 110 and the outer strip 120 use was made of rubber compounds that have an elastic modulus G' greater than or equal to 40 MPa and a viscous modulus G" comprised between 9 and 10 MPa.

In this document, the terms "elastic modulus G'" and "viscous modulus G"" denote dynamic properties well known to those skilled in the art. These properties are measured on a viscoanalyser of the Metravib VA4000 type on test specimens molded from raw compounds or on test specimens bonded together from cured compounds. Test specimens such as those described in the standard ASTM D 5992-96 (the version published in September 2006 but initially approved in 1996) in FIG. X2.1 (a circular method) are used. The diameter "d" of the test specimen is 10 mm (so the test specimen therefore has a circular cross section of 78.5 mm$^2$), the thickness "L" of each of the portions of rubber compound is 2 mm, giving a "d/L" ratio of 5 (in contrast with standard ISO 2856, mentioned at paragraph X2.4 of the ASTM standard, which recommends a d/L value of 2).

The response of a test specimen of vulcanized rubber compound subjected to a sinusoidal stress in alternating simple shear, at a frequency of 10 Hz and at a stabilized temperature of 23° is recorded. The test specimen is stressed symmetrically about its equilibrium position. The amplitude of deformation sweep ranges from 0.1% to 50% (on the outbound cycle), and then from 50% to 0.1% (on the return cycle). The result which is used is the dynamic shear elastic modulus (G') and the viscous shear modulus (G") at 10% deformation on the return cycle.

In order to reduce the rolling resistance, document WO 2010/072736 teaches the production of the outer strip, and possibly also of the bead filler, from a rubber compound that has an elastic modulus G' less than or equal to 15 MPa and a viscous modulus G" such that:

$G"[MPa]0.2-G'[MPa]-0.2$ MPa.

Table I gives two examples of such rubber compounds. The composition is given in phr ("per hundred rubber"), that is to say in part by weight per 100 parts by weight of rubber. The corresponding dynamic moduli are also indicated.

TABLE I

| Parts en phr | Compound 1 | Compound 2 |
| --- | --- | --- |
| NR [1] | 100 | 100 |
| N 330 | | |

TABLE I-continued

| Parts en phr | Compound 1 | Compound 2 |
|---|---|---|
| N 990 | 85 | 85 |
| Graphite | 40 | |
| Paraffin oil | | |
| Antioxidant (6PPD) [2] | 2 | 2 |
| Cobalt naphthenate | 3 | 3 |
| Stearic acid | 1 | 1 |
| ZnO | 7 | 7 |
| Formaphenol resin | | |
| Hardening agent | | |
| Sulfur | 7 | 7 |
| Accelerator (TBBS) [3] | 1 | 1 |
| G' | 5 | 2 |
| G" | 0.8 | 0.2 |

Notes for Table 1:
[1] Natural rubber
[2] N-(1,3-dimethylbutyl)-N'-phenyl-p-phenylenediamine
[3] N-tert-butyl-2-benzothiazyl sulphonamide The rubber compound is preferably based on at least one diene elastomer, a reinforcing filler and a cross-linking system.

What is meant by a "diene" elastomer (interchangeable with rubber) is, in the known way, an elastomer derived at least in part (i.e. a homopolymer or a copolymer) from diene monomers, i.e. monomers which have two carbon-carbon double bonds, which may or may not be conjugated bonds. The diene elastomer used is preferably chosen from the group consisting of polybutadienes (BR), natural rubber (NR), synthetic polyisoprenes (IR), butadiene-styrene copolymers (SBR), isoprene-butadiene copolymers (BIR), isoprene styrene copolymers (SIR), butadiene-styrene-isoprene copolymers (SBIR) and compounds of these elastomers.

One preferred embodiment uses an "isoprene" elastomer, that is to say a homopolymer or a copolymer of isoprene, or in other words a diene elastomer chosen from the group consisting of natural rubber (NR), synthetic polyisoprenes (IR), the various copolymers of isoprene and compounds of these elastomers.

The isoprene elastomer is preferably natural rubber or synthetic polyisoprene of the cis-1,4 type. Of the synthetic polyisoprenes, those used for preference are polyisoprenes that have a ratio (molar %) of cis-1,4 bonds above 90%, more preferably still above 98%. According to other preferred embodiments, the diene elastomer may consist, fully or in part, of some other diene elastomer such as, for example, SBR elastomer (E-SBR or S-SBR) used either cut with some other elastomer, for example of the BR type, or uncut.

The rubber compound may also contain all or some of the additives customarily used in rubber matrices for the manufacture of tires, such as, for example, reinforcing fillers such as carbon black or inorganic fillers such as silica, coupling agents for inorganic fillers, anti-aging agents, antioxidants, plasticizers or extension oils, whether the latter be of the aromatic or non-aromatic kind (notably oils that are very weakly aromatic or non-aromatic, for example of the napthene or paraffin type, with a high or preferably a low viscosity, MES or TDAE oils, plasticizing resins with a high Tg above 30° C.), processability agents that make the compounds easier to process in the raw state, tackifying resins, a cross-linking system based either on sulfur or on sulfur donors, and/or on peroxide, accelerators, vulcanization activators or retarders, anti-reversion agents, methylene acceptors and donors such as HMT (hexamethylenetetramine) or H3M (hexamethoxymethylmelamine) for example, reinforcing resins (such as resorcinol or bismaleimide), known adhesion promoting systems of the metallic salts type for example, notably cobalt or nickel salts.

The compounds are manufactured in suitable mixing mills using two successive phases of preparation well known to those skilled in the art: a first phase of thermomechanical kneading or work (the so-called "non-productive" phase) carried out at high temperature, up to a maximum temperature comprised between 110° C. and 190° C., preferably between 130° C. and 180° C., followed by a second phase of mechanical work (the so-called "productive" phase) up to a lower temperature, typically below 110° C., during which finishing phase the cross-linking system is incorporated.

By way of example, the non-productive phase is carried out in a single thermomechanical step lasting a few minutes (for example between 2 and 10 min) during which all the basic components needed together with other additives with the exception of the cross-linking or vulcanizing system are introduced into an appropriate mixing mill such as a customary internal mixer. Once the compound thus obtained has cooled, the vulcanizing system is then incorporated in an external mixing mill such as an open mill kept at low temperature (for example between 30° C. and 100° C.). Everything is then kneaded (productive phase) for a few minutes (for example between 5 and 15 min).

The final compound thus obtained is then calendered, for example rolled into the form of a sheet or slab for characterizing, or alternatively is extruded to form the outer strip used in a tire according to an embodiment the invention.

Vulcanizing (or curing) can then take place in the known manner at a temperature generally comprised between 130° C. and 200° C., preferably under pressure, for a long enough length of time that may vary for example between 5 and 90 min notably according to the curing temperature, to the vulcanizing system adopted and to the vulcanizing dynamics of the compound in question.

The formulation of the rubber compound used for the bead filler may be identical to that of the rubber compound that forms the outer strip, with the exception of the addition of cobalt salts to encourage adhesion between the bead filler and the bead wire, as is well known to those skilled in the art.

Figure 6:
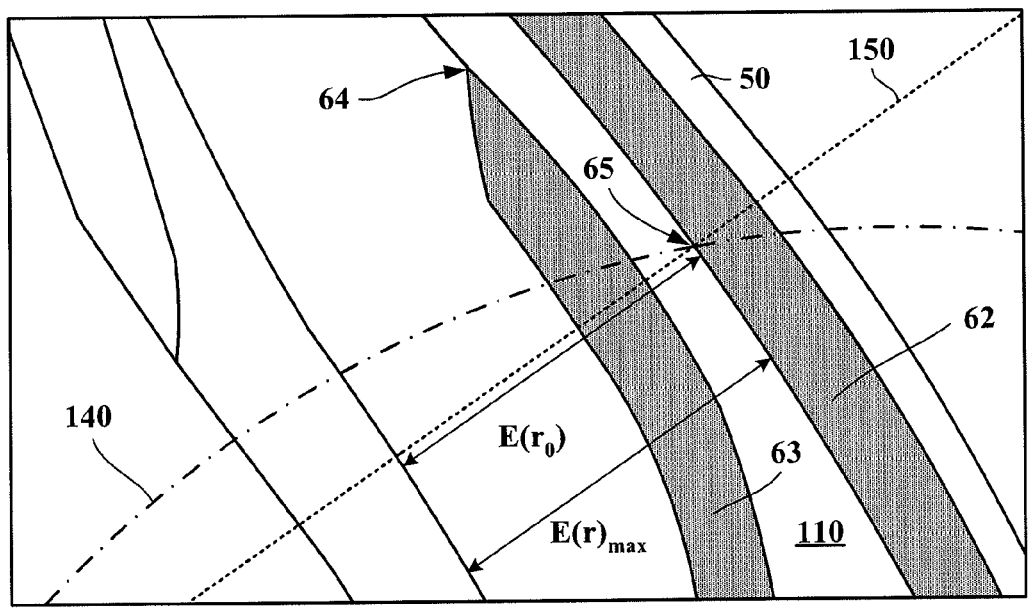

Document WO 2010/072736 also teaches an advantageous bead geometry. Consider the thickness E(r), in a radial cross section, of the entity formed by the bead filler and the outer strip. FIGS. 5 and 6 illustrate how the thickness E(r) is determined. FIG. 6 is an enlargement of the region contained in the box 200 in FIG. 5. Tracking along the interface between the main portion 62 of the carcass reinforcement 60 and the bead filler 110, each point on this interface is a distance r from the radially innermost point 71 of the annular reinforcing structure 70. If there are several radially innermost points of the annular reinforcing structure, any one of these points is chosen to be the reference point. For a given distance $r_0$, the corresponding point 65 of the interface is found by plotting a circle 140 of radius $r_0$ around the radially innermost point 71 of the annular reinforcing structure 70, as has been depicted in FIG. 5. Next, the direction 150 perpendicular to the main portion 62 of the carcass reinforcement 60 which passes through the point 65 of the interface is plotted. The thickness $E(r_0)$ corresponds to the length of the intersection of the direction 150 with the entity formed by the bead filler and the outer strip. The thickness of the wrapped-around portion 63, if the direction 150 intersects it, is disregarded.

FIG. 6 also indicates the maximum thickness $E(r)_{max}$ of the entity formed by the bead filler and the outer strip. The ratio $$\frac{E(r)_{max} - DE}{E(r)_{max}},$$

where DE is the maximum axial width of the bead wire 70 (see FIG. 5), is equal to 18% in this instance.

Figure 7:
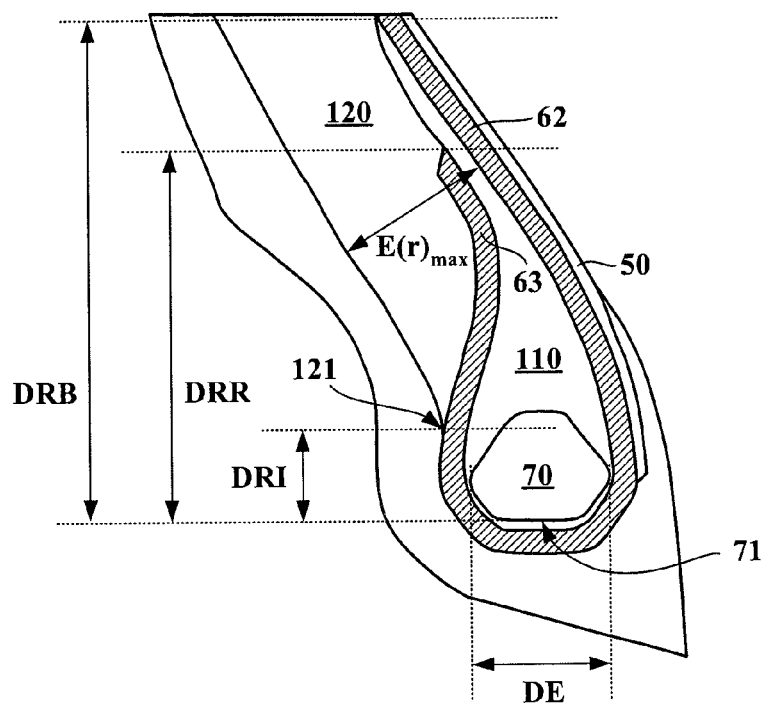
FIG. 7 depicts, in radial section, a portion of a tire according to an embodiment of the invention.

FIG. 7 depicts, in radial section, a portion of a tire according to an embodiment the invention. The bead differs from a tire of the prior art in the axial width DE of the bead wire 70. This width is chosen such that the ratio $$\frac{E(r)_{max} - DE}{E(r)_{max}}$$

is less than or equal to 10%. In this particular instance, the ratio is 9%. Further, the radial height DRR is equal to 13% of the radial height H of the tire, and the radial height DRB is equal to 19% of the radial height H of the tire.

The invention is not restricted to one particular type of bead wire. It can be implemented with braided bead wires, but can also be implemented with "bead bundles" using round wire (as disclosed, by way of example in document CA 2 026 024) or square wire (document U.S. Pat. No. 3,949,800 represents one example of this), made up of an individual wire or strand coated with rubber, wound in a helix with contiguous turns stacked on one another, the plurality of superposed layers forming an endless reinforcing annulus of polygonal cross section. The use of bead wires like those disclosed in document WO 01/54929, and more particularly of 3-4-3-2 construction has proven to be particularly advantageous because it allows the wire to be sufficiently engineered without any unnecessary addition of mass.

Figure 8:
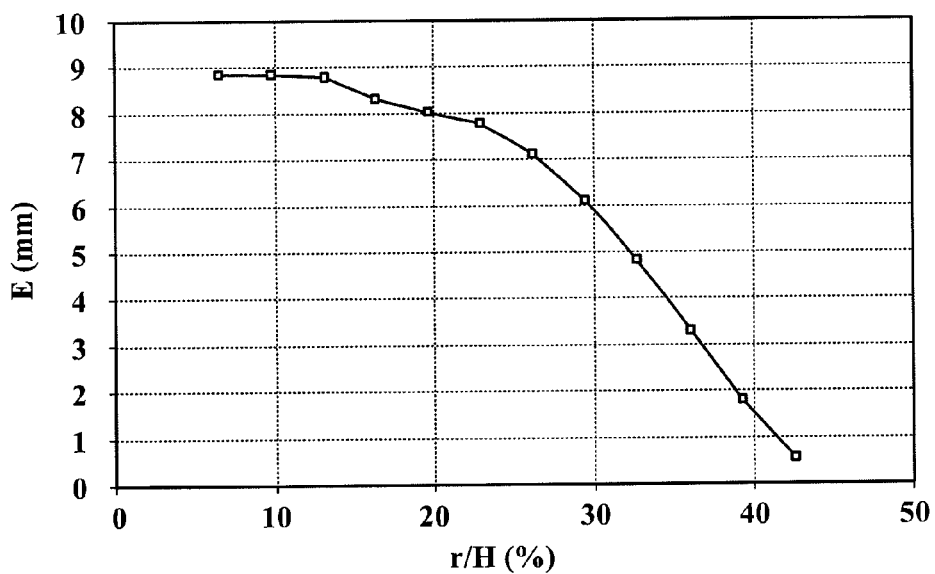
FIGS. 8 and 9 depict the thickness of the entity formed by the bead filler and the outer strip for a tire according to an embodiment the invention.
Figure 9:
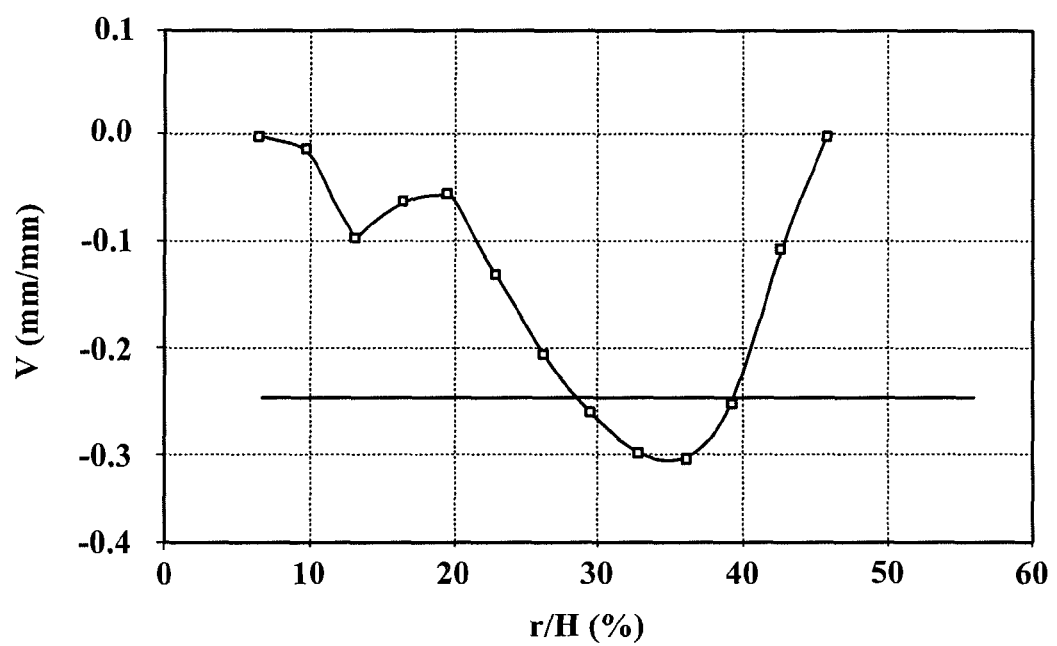

FIG. 8 depicts the thickness E as a function of the distance r for the tire depicted in FIG. 7. The variation V in its thickness (i.e. the function $$\frac{\partial E(r)}{\partial r})$$

as a function of the radius r is depicted in FIG. 9. It may be seen that the thickness E(r) changes as a function of the distance r such that, in the range of distances r comprised between 25 and 45% of the height H of the tire, the variation in thickness $$\frac{\partial E(r)}{\partial r}$$

is less than or equal to −0.25 mm/mm over approximately 11% of the height H of the tire and equal to −0.3 mm/mm over approximately 4% of the height H of the tire.

The applicant has conducted comparative tests on tires of 235/65 R 17 size. A tire with a bead as depicted in FIG. 5 was compared with a tire with a bead as depicted in FIG. 7. The two tires had the same cornering stiffness but the rolling resistance of the tire according to an embodiment the invention was 5% lower. More importantly still, the tire according to an embodiment of the invention allowed an improvement in manufacturing productivity (number of compliant tires produced per unit time) of around 15% over the tire according to the prior art. No difference in terms of tire endurance was noted.

The invention claimed is:

1. A tire comprising:
two beads designed to come into contact with a mounting rim, each bead comprising at least one annular reinforcing structure;
two sidewalls extending the beads radially outwards, the two sidewalls meeting in a crown comprising a crown reinforcement surmounted by a tread;
at least one carcass reinforcement extending from the beads through the sidewalls as far as the crown, the carcass reinforcement comprising a plurality of carcass reinforcing elements and being anchored in the two beads by being wrapped around the annular reinforcing structure so as to form, within each bead, a main portion and a wrapped-around portion, each wrapped-around portion extending radially outwards as far as an end situated a radial distance DRR from the innermost point of the annular reinforcing structure of the bead, the radial distance DRR being greater than or equal to 7%, and less than or equal to 85%, of the radial height H of the tire;
wherein each bead comprises a bead filler, the bead filler being situated radially on the outside of the annular reinforcing structure and at least partially between the main portion and the wrapped-around portion of the carcass reinforcement, the bead filler extending radially outwards from the radially innermost point of the annular reinforcing structure of the bead as far as a radial distance DRB from the said point, the radial distance DRB being less than 20% of the radial height H of the tire,
wherein each bead further comprises an outer strip positioned axially on the outside of the carcass reinforcement and of the bead filler, each outer strip extending radially between a radially inner end of the outer strip and a radially outer end of the outer strip, the radially inner end of the outer strip being situated at a distance DRI from the radially innermost point of the annular reinforcing structure of the bead, the radial distance DRI being less than or equal to 20% of the radial height H of the tire, the radially outer end of the outer strip being situated at a distance DRL from the radially innermost point of the annular reinforcing structure of the bead, the radial distance DRL being greater than or equal to 25% of the radial height H of the tire,
wherein the bead filler and the outer strip are made of a rubber compound that has an elastic modulus G' less than or equal to 15 MPa and a viscous modulus G" such that:

$G''[\text{MPa}] \le 0.2 \cdot G'[\text{MPa}] - 0.2 \text{ MPa},$ the elastic and viscous moduli being measured at 23° C.;
wherein the entity formed by the bead filler and the outer strip has a thickness E(r), this thickness corresponding to the length of the intersection of the direction perpendicular to the main portion of the carcass reinforcement with said entity, r denoting the distance separating the intersection of said direction perpendicular to the main portion of the carcass reinforcement from the radially innermost point of the annular reinforcing structure, the thickness E(r) changing as a function of the distance r such that, in the range of distances r comprised between 25 and 45% of the height H of the tire, the variation in thickness $$\frac{\partial E(r)}{\partial r}$$

is less than or equal to −0.25 mm/mm over at least 4% of the height H of the tire, and wherein said at least one annular reinforcing structure has a maximum axial width DE such that the ratio, $$\frac{E(r)_{max} - DE}{E(r)_{max}}$$

where $E(r)_{max}$ is the maximum value of the thickness $E(r)$, is less than or equal to 10%.

2. The tire of claim 1, wherein the radial distance DRR is greater than or equal to 10% and less than or equal to 20% of the radial height H of the tire.

3. The tire of claim 1, wherein the radial distance DRL between the radially outer end of the outer strip and the radially innermost point of the annular reinforcing structure of the bead, is greater than or equal to 40% of the radial height H of the tire.

4. The tire according to claim 1, wherein the radial distance DRL between the radially outer end of the outer strip and the radially innermost point of the annular reinforcing structure of the bead, is less than or equal to 45% of the radial height H of the tire.

5. The tire according to claim 1, wherein, in the range of distances r comprised between 25 and 45% of the height H of the tire, the variation in the thickness $$\frac{\partial E(r)}{\partial r}$$

is less than or equal to −0.3 mm/mm over at least 4% of the height H of the tire.

6. The tire according to claim 1, wherein the ratio $$\frac{E(r)_{max} - DE}{E(r)_{max}}$$

is less than or equal to 7%.

\* \* \* \* \*